Patented Nov. 1, 1949

2,486,487

UNITED STATES PATENT OFFICE 2,486,487

SEALING COMPOSITION CONTAINING ASPHALT, N-BUTYL METHACRYLATE AND CETYL ACETAMIDE WAX

William P. Lowden, Pitman, N. J., assignor to Radio Corporation of America, a corporation of Delaware No Drawing. Application March 17, 1945, Serial No. 583,399

3 Claims. (Cl. 260—28.5)

The present invention relates to potting and sealing compounds and more particularly to such a compound having asphalt as the main base.

While potting and sealing compounds are well known as impregnating agents for coils and other electrical equipment, the composition of such compounds has remained relatively static and has failed to keep pace with the rapid improvement in radio and electronic apparatus. For example, operating conditions for transformer coils and Faradon capacitors have become much more exacting so that industry has had the problem of finding a potting and sealing compound of such enhanced properties as will meet present day requirements.

The general properties such a compound must possess can be enumerated as follows:

1. A viscosity which enables complete penetration to all parts at a pouring temperature of 180–200° C. Such a viscosity measured by the Stormer viscosimeter at 200° C. can range from 100–500 centipoises.
2. Good adhesion to metal and to rubber or braided leads. Also to molded phenolics.
3. Excellent resistance to salt water immersion at 50° C., to water at 65° C. and to salt spray at 30–35° C.
4. Resistance to low temperature, —50 to —60° C., cracking under repeated cycling. If fine fractures occur, they should have an annealing tendency upon rising temperature.
5. Power factor of .5 percent or less at 1 kc. at 25° C.
6. A cold flow of at least 100° C. in order to allow for an ambient plus operating temperature of 95° C. maximum. This naturally implies that the consistency of the compound should be such as to offer a fair means of support for the coil under operating temperatures.

Cold flow, in this case, being the amount of extrusion through a ½" orifice of a container 2½" diameter by 4" deep filled with compound and suspended for 48 hours at the desired temperature. A maximum of ½" extrusion being arbitrarily taken as an acceptable standard. Asphalts have long been recognized as a cheap and satisfactory potting compound. It is known that the properties of asphalts can vary appreciably according to the petroleum from which they are prepared, the method of preparation and by blending operations. However, no particular asphalt, straight or blended, appears to meet the above specifications. As a general example, asphalts, soft to semi-brittle, ranging in B and R softening points from 80–97° C. meet several of the above requirements but fail by far in cold flow properties; on the other hand, asphalts, soft to hard, ranging in B and R softening points from 115–155° C., generally fail in most of the requirements. The viscosities at 200° C. and over are too high for efficient potting and failures occur on salt water immersion tests, salt spray and from low temperature chipping and cracking. Despite the high softening temperatures only a very few even meet the cold flow requirements.

Some of the objects of the present invention are: to provide an improved compound for potting and sealing coils and other electrical units; to provide a compound having low viscosity but high cold flow; to provide a compound having good adhesion and electrical properties; to provide a compound having resistance to cold temperature cracking; and to provide a compound resistant to salt water immersion and spray test.

In accordance with the present invention, while asphalt is taken as the main base, its characteristics are modified in such a novel manner as to solve the problem of a compound fulfilling present day requirements. The invention contemplates the use of both an asphalt of the high melting group and an asphalt of the low melting group. Of the former group an asphalt is selected having a viscosity of 1600 centipoises at 200° C.; B and R softening point of 135° C.; and a cold flow of 100° C. As illustrative of compounds formed with an asphalt of the high melting group, the following examples are given:

1. The coumarone-indene family of resins exhibits low power factor, good dielectric, very good moisture and salt water resistance properties. A paracoumarone indene resin of varnish grade having a melting point range of 127°–137° C. and a viscosity of 95–105 centipoises at 200° C. is used as a representative resin of this family. Accordingly, when 90 parts of the asphalt are mixed at 200° C. with 10 parts of the resin, the resulting properties of the blend show a marked change. The viscosity drops to 235 centipoises, the B and R softening point to 108° C. and the cold flow to 75° C. It is to be noted that the change is downward and collectively.

2. Hydrocarbon thermoplastic terpene resins also have the same general and desirable properties as the coumarone-indene resins. When 90 parts of the asphalt are mixed at 200° C. with 10 parts of thermoplastic terpene hydrocarbon resin having a softening point of 100° C. and an acid number less than 4, the resulting properties of the blend reveal a viscosity of 1000 centipoises, a B and R softening point of 138° C. and a cold flow of 102° C. It is to be noted that the viscosity shows an appreciable drop but the other two properties practically remain unchanged. The blend exhibits very good adhesion.

3. Synthetic waxes of the cetyl acetamide type, which are high molecular weight aliphatic amides, exhibit good resistance to moisture and to oxidation, also fairly good dielectric resistance. A cetyl acetamide wax having a melting point of 137°–139° C. is used as a representative wax. Accordingly, when 90 parts of the asphalt are mixed at 200° C. with 10 parts of the wax, the resulting properties of the blend reveal a viscosity of 115 centipoises, a B and R softening point of 124° C. and a cold flow of 118° C. It is to be noted that the viscosity drops very sharply, the B and R softening point drops moderately, but the cold flow shows a decided increase. Blend exhibits fairly good resistance to low temperature cycling. Fine cracks occur on repeated cycling but an annealing tendency prevails upon rising temperature.

4. Solid polymers of normal butyl methacrylate possess good adhesion, flexibility and have fairly good resistance to moisture, those polymers having a softening point of 65.5°–74° C. being used as representative. Accordingly, when 90 parts of the asphalt are mixed at 200° C. with 10 parts of the resin, the resulting properties of the blend reveal a viscosity of 1150 centipoises at 225° C., a B and R softening point of 1400° C. and a cold flow of 95° C. It is to be noted that the viscosity shows a marked increase, the B and R softening point a moderate increase, but the cold flow shows a moderate drop. The blend exhibits very good adhesion, flexibility and cold temperature resistance.

Having the foregoing in mind, the properties of a high melting asphalt can be varied more or less within the invention to meet the desired specifications. Thus, for a blend giving a viscosity of 135 centipoises, a B and R softening point of 120° C., and a cold flow of 103° C., the parts proportion may be as follows:

| | Parts |
|---|---|
| High melting asphalt | 90 |
| Thermoplastic terpene hydrocarbon resin having a softening point of 100° C. and an acid number less than 4 | 5 |
| Cetyl acetamide wax having a melting point of 137°–139° C. | 5 |

For a blend giving a viscosity of 536 centipoises, a B and R softening point of 122° C., and a cold flow of 103° C., the parts proportion may be as follows:

| | Parts |
|---|---|
| High melting asphalt | 90 |
| Normal butyl methacrylate polymer having a softening point between 65.5°–74° C. | 5 |
| Cetyl acetamide wax having a melting point of 137°–139° C. | 5 |

The invention is not limited to the proportions set forth because diverse specifications can be met by varying the percentages and the materials.

In the case of a low melting asphalt, the same general tendency prevails as found with a high melting asphalt though not to the same degree due to the difference in the initial properties. However, the cold flow property can be raised without affecting other desirable properties to any extent.

A representative asphalt of the low melting group has the following properties: viscosity 207 centipoises at 200° C.; B and R softening point of 87° C., and a cold flow of 45° C., which properties can be changed collectively or individually as desired. As illustrative of compounds formed with an asphalt of the low melting group, the following examples are given:

1. A thermoplastic terpene hydrocarbon resin having a softening point of 115° C. and an acid number less than 4 is used as a representative of the hydrocarbon thermoplastic terpene resins. Accordingly when 90 parts of the asphalt are mixed at 200° C. with 10 parts of the terpene resin the resulting properties of the blend reveal a viscosity of 193 centipoises, a B and R softening point of 90° C. and a cold flow of 47° C. Drop in viscosity is moderate while the other two properties remain practically unchanged.

2. A wax having a melting point of 137°–139° C. is being used as a representative of the cetyl acetamide type of synthetic wax. Accordingly, when 90 parts of the asphalt are mixed at 200° C. with 10 parts of the wax the blend has the following properties: A viscosity of 94 centipoises, a B and R softening point of 124° C. and a cold flow of 110° C. It can be noted that there is a marked drop in viscosity but a very sharp increase in B and R softening point and a decided increase in cold flow. Cold resistance is an improvement over the asphalt alone.

3. Polymers having a softening point of 65.5°–74° C. are being used as a representative polymers of normal butyl methacrylate. Accordingly, when 90 parts of the asphalt are mixed at 200° C. with 10 parts of the methacrylate polymers, the resulting properties of the blend reveal a viscosity of 555 centipoises, a B and R softening point of 101° C. and a cold flow of 55° C. It can be noted that the change is upward and collectively. The blend exhibits very good adhesion, flexibility and resistance to cracking at the lower temperatures.

Having the aforementioned illustrations in mind, the properties of a low melting asphalt can be varied to meet the desired specifications as the following examples serve to show.

For a blend giving a viscosity of 165 centipoises, a B and R softening point of 120° C. and a cold flow of 98° C., the following proportions may be used and produce good resistance to low temperature cycling:

| | Parts |
|---|---|
| Low melting asphalt | 90 |
| Cetyl acetamide wax, melting point 137°–139° C. | 6 |
| Normal butyl methacrylate polymer having a softening point of 65.5°–74° C. | 4 |

For a blend giving a viscosity of 95 centipoises, a B and R softening point of 124° C. and a cold flow of 110° C., the following proportions may be used:

| | Parts |
|---|---|
| Low melting asphalt | 90 |
| Cetyl acetamide wax having a melting point of 137°–139° C. | 10 |

For a blend giving a viscosity of 105 centipoises, a B and R softening point of 118° C. and a cold flow of 99° C., the following proportions may be used to produce good adhesion:

|   | Parts |
|---|---|
| Low melting asphalt | 90 |
| Cetyl acetamide wax, melting point 137°–139° C. | 6 |
| Thermoplastic terpene hydrocarbon resin having a softening point of 100° C. and an acid number less than 4 | 4 |

Under certain conditions where power factor is not too critical, it is advisable to add a plasticizer to develop better adhesion and flexibility for low temperature resistance. In such cases, it is preferable to use the ricinoleate of ethylene glycol ethyl ether and/or hydrogenated methyl abietate in the following proportions to produce a viscosity of 60 centipoises, a B and R of 124° C. and a cold flow of 105° C.:

|   | Parts |
|---|---|
| Low melting asphalt | 60 |
| The terpene resin | 25 |
| The cetylacetamide wax | 10 |
| Ricinoleate of ethylene glycol ethyl ether | 5 |

For improved thermal properties, it is beneficial to incorporate varying percentages of mineral fillers, either alone or in combination with fibrous fillers such as fiber glass. An example of the proportions in such a case may be as follows to give a viscosity of 90 centipoises, a B and R of 124° C. and a cold flow of 100° C.

|   | Parts |
|---|---|
| Low melting asphalt | 50 |
| The terpene resin | 15 |
| The cetyl acetamide wax | 10 |
| Silica | 15 |
| Ricinoleate of ethylene glycol ethyl ether | 10 |

It will now be apparent that the composition of the invention possesses properties covering a relatively wide range of viscosity, a high cold flow, good resistance to low temperature cracking and cycling, and one capable of varying proportions and materials having as a base the group including asphalt of low and high melting points.

I claim as my invention:

1. A potting and sealing composition, characterized by having good electrical properties, said composition consisting essentially of about 90 percent asphalt, 4 to 5 percent of a polymer of normal butyl methacrylate having a softening point of about 65.5°–74° C., and 5 to 6 percent of a cetyl acetamide wax having a melting point of about 137°–139° C.

2. A composition according to claim 1 in which said asphalt has a viscosity of about 1600 centipoises at 200° C., a softening point of about 135° C., and a cold flow of 100° C.

3. A composition according to claim 1 in which said asphalt has a viscosity of about 207 centipoises at 200° C., a softening point of 87° C., and a cold flow of about 45° C.

WILLIAM P. LOWDEN.

REFERENCES CITED

The following references are of record in the file of this patent:

UNITED STATES PATENTS

| Number | Name | Date |
|---|---|---|
| 2,194,958 | Szegvari et al. | Mar. 26, 1940 |
| 2,232,595 | Dittmar et al. | Feb. 18, 1941 |
| 2,365,491 | Powers | Dec. 19, 1944 |
| 2,408,297 | Cubberley et al. | Sept. 24, 1946 |

FOREIGN PATENTS

| Number | Country | Date |
|---|---|---|
| 546,562 | Great Britain | July 20, 1942 |
| 563,714 | Great Britain | Aug. 28, 1944 |

OTHER REFERENCES

Ind. & Eng. Chem., Jan. 1942, p. 68.